3,294,765
ETHYLIDENE-BIS-3(N-VINYL-2-PYRROLIDONE) AND POLYMERS THEREOF

Eugene V. Hort, Edison, Frederick Grosser, Midland Park, and Arthur Schwartz, Metuchen, N.J., assignors to General Aniline & Film Corporation, New York, N.Y., a corporation of Delaware
No Drawing. Filed Oct. 2, 1963, Ser. No. 313,193
13 Claims. (Cl. 260—80.3)

This invention relates to a new divinyl monomer, more particularly to ethylidene-bis-3(N-vinyl-2-pyrrolidone), to the process of preparing the same, and to the process of copolymerizing it with other polymerizable vinyl monomers.

We have found that sodium can be dissolved in N-vinyl-2-pyrrolidone at a temperature of from 120° to 130° C. with no evolution of hydrogen. This solution after cooling to room temperature solidifies to a waxy material. The latter, when hydrolyzed with water yields a white slurry, which after filtering, washing with water and drying, yields crude ethylidene-bis-3-(N-vinyl-2-pyrrolidone), hereinafter referred to for simplicity as EBVP, having a melting point of 117° C. During hydrolysis little exotherm takes place with no evolution of hydrogen. By recrystallization from ethanol a pure material (crystalline solid) having a melting point of 121° C. is obtained.

Since we have not established the reaction mechanism, or identified the by-products, we do not know the stoichiometry of the reaction of sodium with N-vinyl-2-pyrrolidone. The preferred range of sodium seems to encompass from 3 to 6% by weight of N-vinyl-2-pyrrolidone, corresponding to 0.15–0.30 atom of sodium per molecule of N-vinyl-2-pyrrolidone. The yield of EBVP in this range is about 30% effective, based on the weight of N-vinyl-2-pyrrolidone. Amounts of sodium higher than 6% are very difficult to dissolve, even over a long period, and the final product may be a gummy oil rather than a crystalline solid. Amounts of sodium lower than 3% give little or no product, but a solution which upon standing develops an insoluble "popcorn" polymer.

As an alternative to the foregoing procedure, the sodium can be dissolved by refluxing a solution of N-vinyl-2-pyrrolidone in an inert-solvent diluent such as toluene, heptane, etc. The amount of inert solvent diluent employed is immaterial so long as there is sufficient N-vinyl-2-pyrrolidone to satisfy the foregoing stoichiometric requirement. We prefer, however, a solution of equal parts by weight. When the sodium is completely dissolved, the solution is cooled to room temperature and the inert-solvent diluent decanted from the waxy material. The waxy material is heated with the same weight of inert-solvent diluent until sufficiently fluid to agitate, which after cooling to room temperature is again decanted. The combined liquid extracts are then evaporated to dryness and the residue hydrolyzed with a five-fold weight of water. After washing and drying the hydrolyzed residue, there is obtained EBVP in the same yield as before, but in slightly improved purity, i.e., melting at 119.4° C.

Instead of toluene or heptane as an inert-solvent diluent for the N-vinyl-2-pyrrolidone there may be used such as, for example, xylene, cumene, kerosene, naphtha, octane, etc.

The following examples will serve to further illustrate our invention:

Example I

A total of 25 grams of sodium metal was added over a half hour period to 475 grams of N-vinyl-2-pyrrolidone and stirred at 120–130° C. After about one more hour, the sodium had completely dissolved. The solution was allowed to cool and slowly solidified to a waxy material. This was agitated with 5 volumes of water, partly dissolving and leaving a white slurry. After filtering, washing with water and drying in a vacuum oven, there was obtained 140 grams of crude EBVP, M.P. 117° C. By recrystallization from ethanol a pure material, M.P. 121° C., was obtained.

Percent calculated for $C_{14}H_{20}N_2O_2$: C, 67.71; H, 8.12; N, 11.31. Percent found: C, 67.93; H, 8.04; N, 11.61.

The pure product has the following structure:

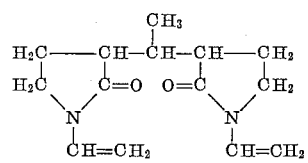

The foregoing structure was established not only from the elementary analysis, which agrees very closely with the postulated empirical formula, $C_{14}H_{20}N_2O_2$, but also by means of nuclear magnetic resonance which shows that the two-carbon moiety is an ethylidene group linking two N-vinyl-2-pyrrolidone units in their 3-positions. The unsaturation of the two vinyl groups was determined by iodination. The value of 87.7% vinyl pyrrolidone corresponds to a molecular weight of 253 for a compound containing two vinyls. Since infra-red and ultra-violet spectra were very similar to those of N-vinyl-2-pyrrolidone, it was reasonably concluded that EBVP contained two N-vinyl-2-pyrrolidone units bound together with a two-carbon moiety, i.e. an ethylidene linkage.

Example II

Twelve grams of sodium was dissolved in a refluxing solution of 300 grams of vinyl pyrrolidone and 300 grams of toluene. When the sodium had completely dissolved, the solution was cooled and the toluene decanted from the waxy precipitate. The precipitate was heated with 300 grams more of toluene until it became fluid, which after cooling was again decanted.

The combined toluene extracts were evaporated to dryness and the residue agitated with a five-fold weight of water. After washing and drying, 75 grams of EBVP, melting at 119.4°, was obtained. By recrystallization from ethanol, a pure material, M.P. 121° C. was obtained.

EBVP copolymers readily with N-vinyl lactams and other polymerizable monomers containing a vinyl group to give products ranging from thickened solutions to intractable gels depending upon the proportion of EBVP used. EBVP is particularly useful for cross-linking various types of polymers of monomeric vinyl compounds. For example by incorporating various percentages of EBVP into N-vinyl lactam polymerizations and polymerizations of other monomeric vinyl compounds, under the usual polymerization procedures, cross-linked polymers ranging from a slightly increased viscosity up to insoluble solids are obtained.

As examples of N-vinyl lactams, i.e. containing a 5, 6 or 7-membered heterocyclic ring, which may be employed in polymerizations, alone or in combination with each other or with other polymerizable monomeric vinyl compounds and cross-linked with EBVP, the following are illustrative:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
3-ethyl-N-vinyl-2-pyrrolidone
4-methyl-N-vinyl-2-pyrrolidone
4-ethyl-N-vinyl-2-pyrrolidone
N-vinyl-2-piperidone
N-vinyl-ε-caprolactam The foregoing N-vinyl lactams are well known compounds and have been described in chemical literature as well as in United States Patents 2,265,450, 2,317,804 and 2,335,454 in which working examples of most of the above species are given.

The various monomers containing a polymerizable vinyl group, other than N-vinyl lactams, which may be employed in polymerizations alone or in combination with each other or with N-vinyl lactams and cross-linked with EBVP, include N-vinyl oxazolidone, N-vinyl imidazolone, N-vinyl-3-morpholinone; vinyl acetate, vinyl methoxyacetate, vinyl diethylacetate, vinyl trimethylacetate, vinyl propionate, vinyl isobutyrate, vinyl butyrate, vinyl acrylate, vinyl methacrylate, vinyl lactate, vinyl caproate, vinyl caprylate, vinyl stearate, etc. Acrylic and methacrylic monomers such as methyl methacrylate, cyclohexyl methacrylate, isobutyl methacrylate, isoamyl methacrylate, β-methoxyethyl methacrylate and α-(o-chlorophenyl) ethyl methacrylate, β - phenoxyethyl methacrylate, β - phenylethyl methacrylate, phenyl methacrylate, o-cresol methacrylate, P-chlorohexylphenyl methacrylate, 2-nitro-2-methylpropyl methacrylate, diethylaminoethyl methacrylate, ethylidene acetate methacrylate and glycidyl methacrylate, including esters of haloacrylic acids, such as methyl-α-chloroacrylate, ethyl - α - chloracrylate, phenyl-a-chloroacrylate, a-ethyl acrylic acid, methyl acrylate, propyl acrylate, acrylic acid, methacrylic acid, etc., acrylonitrile, acrylamide, methacrylamide, as well as N-alkyl and N-aryl substituted acrylamides, monomers of vinyl alkyl and aryl esters, such as methyl vinyl ether, ethyl vinyl ether, isopropyl vinyl ether, n-butyl vinyl ether, isobutyl vinyl ether, 2-ethylhexyl vinyl ether, vinyl 2-methoxyethyl ether, vinyl 2-chloroethyl ether, vinyl phenyl ether, α-chlorovinyl phenyl ether, α-bromovinyl phenyl ether, α-methylvinyl phenyl ether, α-phenylvinyl phenyl ether, vinyl o-cresyl ether, vinyl m-cresyl ether, vinyl p-cresyl ether, α-methylvinyl p-cresyl ether, vinyl o-ethylphenyl ether, vinyl p-chlorophenyl ether, vinyl 2,4-dichlorophenyl ether, vinyl 2,4,6-trichlorophenyl ether, vinyl m-hydroxyphenyl ether, vinyl α-naphthyl ether and vinyl β-naphthyl ether, etc.

The following examples will serve to illustrate how polymerizations of N-vinyl lactams, polymerizations of one or two monomeric vinyl compounds, other than N-vinyl lactams, and polymerizations of N-vinyl lactam with any one of the foregoing polymerizable monomeric vinyl compounds, may be cross-linked with EBVP to yield polymers of increased viscosity.

*Example III*

Seven polymerization runs were made and compared with normal runs of polyvinyl 2-pyrrolidone, the only difference being the inclusion or exclusion of the EBVP cross-linking agent. The runs were made according to the following polymerization technique dissolving EBVP in N-vinyl-2-pyrrolidone (V.P.) since EBVP is insoluble in water:

EBVP solution was first added to a reaction flask with reflux condenser, then the proper amount of water added, using some of the water to transfer all the monomer to the flask. With a continuous nitrogen purge, the contents were heated to 55° C. with agitation. Based on the weight of V.P., 2½% of 28% aqueous ammonia was added, followed by the hydrogen peroxide catalyst. Samples were taken periodically to determine the residual V.P. by iodination analysis. When the V.P. content was below 0.5%, the reaction was considered done. Further small additions of $H_2O_2$ may be added at this point to decrease the V.P. content further if deemed necessary. The results obtained are as follows:

| Run No. | EBVP/VP ratio | $H_2O_2$/VP ratio | K-Value (A) | Solids | Comments on appearance |
|---|---|---|---|---|---|
| | Percent | Percent | | Percent | |
| 1 | 0.5 | 0.25 | | 12 | Soft jelly-like material; does not rejoin when broken up. |
| 2 | 0 | 0.25 | 60.3 | 12 | Completely fluid. |
| 3 | 0.5 | 0.5 | | 12 | Soft jelly-like material. |
| 4 | 0 | 0.5 | 46.5 | 12 | Completely fluid. |
| 1a | 0.5 | .25 | | 5 | Viscous fluid. No apparent gel. |
| 2a | 1.0 | .25 | | 5 | Thin jelly-like material. Pours smoothly. |
| 3a | 2.0 | .25 | | 5 | Cloudy gel. Does not pour. |

(A) The K-value is a function of the mean molecular weight as derived by H. Fikentscher, Cellulosechemie 13, 58 (1932).

*Example IV*

A solution of 100 grams of methyl methacrylate in 200 grams of anhydrous ethanol was heated at reflux for 6 hours with 1 gram of benzoyl peroxide as catalyst. A polymer with a specific viscosity (1% solution in 2-butanone) of 0.25 was obtained.

The EBVP was substituted for 1% of the starting amount of methyl methacrylate, a product of specific viscosity 0.35 was obtained.

*Example V*

A solution of 100 grams of vinyl acetate in 222 grams of 90% isopropyl alcohol was heated at reflux for 4 hours with 1 gram of azoisobutyronitrile as catalyst. A polymer with a specific viscosity (1% solution in 90% isopropyl alcohol) of 0.05 was obtained. When EBVP was substituted for 2% of the starting amount of vinyl acetate, a product of specific viscosity 0.10 was obtained.

*Example VI*

| | Grams |
|---|---|
| Vinyl pyrrolidone | 140 |
| Vinyl acetate | 60 |
| 90% Ethanol | 133 |
| Azoisobutyronitrile (AIBN) | 0.4 |

The above solution was heated at reflux for 5 hours, 0.2 gram more AIBN was added and it was held at reflux for 2 more hours. The product had a K-value of 42. The identical procedure with 1.0 gram of EBVP (present at the start) gave a K-value of 55.

*Example VII*

| | Grams |
|---|---|
| Diethylene glycol monoethyl ether | 250 |
| Vinyl oxazolidinone | 188 |
| Methyl methacrylate | 62 |
| Azoisobutyronitrile | 0.38 |

The solution was stirred at 80° under nitrogen for 3 hours then heated to 100° and held one hour. A viscous solution was obtained with a polymer of K-value 42. The identical procedure with 7.5 grams of EBVP (present at the start) gave a thick insoluble gel.

The cross-linked polymers prepared as above are especially useful in a variety of applications, depending on the degree of cross-linking. The degree of cross-linking is determined by the amount of EBVP used, and the properties of the polymer change with the degree of cross-linking. Amounts of EBVP may range from 0.1% to 50% by weight and the balance of either a single polymerizable vinyl monomer or a mixture in any proportions of two separate polymerizable vinyl monomers, in any conventional polymerization reaction, to yield cross-linked polymers of various characteristics.

Since EBVP is soluble in polar organic solvents, including N-vinyl lactams and the aforementioned polymerizable monomers containing a vinyl group, it is especially adaptable in the conventional solution polymerization technique.

Moderately cross-linked polymers retain their solubility and are useful as thickeners, protective colloids, and flocculants. More highly cross-linked polymers swell greatly but do not dissolve. They are particularly useful to absorb various solutions. For example, a gel swollen with aqueous acid has proven useful in oil well acidizing.

Still more highly cross-linked polymers become mechanically stronger and swell less. These are particularly useful as adsorbents and complexing agents for removing traces of materials such as tannins or phenols (which complex with polyvinyl pyrrolidone) from various solutions.

We claim:

1. Ethylidene-bis-3(N-vinyl-2-pyrrolidone) having the following formula:

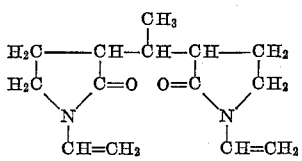

2. The process of preparing ethylidene-bis-3(N-vinyl-2-pyrrolidone) which comprises heating N-vinyl-2-pyrrolidone and from 3 to 6% by weight thereof of sodium to yield a solution, cooling the said solution to precipitate a waxy material, agitating said material with water followed by washing with water, drying the same and recovering the said ethylidene - bis - 3(N - vinyl - 2 - pyrrolidone).

3. Polymers of polymerizable vinyl compounds copolymerized and cross-linked with 0.1% to 50% by weight of ethylidene-bis-3(N-vinyl-2-pyrrolidone).

4. Polymers of N-vinyl lactams copolymerized and cross-linked with 0.1% to 50% by weight of ethylidene-bis-3(N-vinyl-2-pyrrolidone).

5. Polymers of N-vinyl-2-pyrrolidone copolymerized and cross-linked with 0.1% to 50% by weight of ethylidene-bis-3(N-vinyl-2-pyrrolidone).

6. Copolymers of N-vinyl-2-pyrrolidone and vinyl acetate copolymerized and cross-linked with 0.1% to 50% by weight of ethylidene-bis-3(N-vinyl-2-pyrrolidone).

7. The process of preparing cross-linked polymers which comprises copolymerizing and cross-linking from 99.9% to 50% by weight of at least one polymerizable vinyl compound with 0.1% to 50% by weight of ethylidene-bis-3(N-vinyl-2-pyrrolidone) in the liquid phase and in the presence of a free radical catalyst.

8. The process of preparing cross-linked polymers which comprises copolymerizing and cross-linking 99.9% to 50% by weight of a vinyl lactam with 0.1% to 50% by weight of ethylidene-bis-3(N-vinyl-2-pyrrolidone) in the liquid phase and in the presence of a free radical catalyst.

9. The process of preparing cross-linked polymers which comprises copolymerizing and cross-linking 99.9% to 50% by weight of N-vinyl-2-pyrrolidone with 0.1% to 50% by weight of ethylidene-bis-3(N-vinyl-2-pyrrolidone) in the liquid phase and in the presence of a free radical catalyst.

10. The process of preparing cross-linked polymers which comprises copolymerizing and cross-linking 99% by weight of methyl methacrylate with 1% by weight of ethylidene-bis-3(N-vinyl-2-pyrrolidone) in the liquid phase and in the presence of a free radical catalyst.

11. The process of preparing cross-linked polymers which comprises copolymerizing and cross-linking 98% by weight of vinyl acetate with 2% by weight of ethylidene-bis-3(N-vinyl-2-pyrrolidone) in the liquid phase and in the presence of a free radical catalyst.

12. The process of preparing cross-linked polymers which comprises polymerizing and cross-linking 69.7% by weight of vinyl pyrrolidone and 29.8% by weight of vinyl acetate with about .5% by weight of ethylidene-bis-3(N-vinyl-2-pyrrolidone) in the liquid phase and in the presence of a free radical catalyst.

13. The process of preparing cross-linked polymers which comprises polymerizing and cross-linking 73% by weight of vinyl oxazolidone and 24.1% by weight of methyl methacrylate with 2.9% by weight of ethylidene-bis-3(N-vinyl-2-pyrrolidone) in the liquid phase and in the presence of a free radical catalyst.

No references cited.

JOSEPH L. SCHOFER, *Primary Examiner.*

H. WONG, *Assistant Examiner.*